United States Patent
Fei et al.

(10) Patent No.: US 9,975,238 B2
(45) Date of Patent: May 22, 2018

(54) SCREW-FREE ASSEMBLED MODULAR ROBOT

(71) Applicants: SHANGHAI XPARTNER ROBOTICS CO., LTD., Shanghai (CN); ABILIX EDUCATIONAL ROBOT CO., LTD., Shanghai (CN)

(72) Inventors: Xufeng Fei, Shanghai (CN); Zuowei Pang, Shanghai (CN); Xianjian Cai, Shanghai (CN)

(73) Assignees: SHANGHAI XPARTNER ROBOTICS CO., LTD., Shanghai (CN); ABILIX EDUCATIONAL ROBOT CO., LTD., Shanghai (CN)

(*) Notice: Subject to any disclaimer, the term of this patent is extended or adjusted under 35 U.S.C. 154(b) by 274 days.

(21) Appl. No.: 14/734,582

(22) Filed: Jun. 9, 2015

(65) Prior Publication Data
US 2016/0361813 A1   Dec. 15, 2016

(51) Int. Cl.
*B25J 9/08* (2006.01)
*A63H 11/00* (2006.01)

(52) U.S. Cl.
CPC ............... *B25J 9/08* (2013.01); *A63H 11/00* (2013.01); *Y10S 901/01* (2013.01)

(58) Field of Classification Search
CPC .......... B25J 9/08; A63H 11/00; Y10S 901/01
USPC ............... 180/8.1, 8.2, 8.5, 8.6; 318/568.12, 318/568.11
See application file for complete search history.

(56) References Cited

U.S. PATENT DOCUMENTS

| | | | | |
|---|---|---|---|---|
| 5,158,493 A * | 10/1992 | Morgrey | ............... | A63H 11/18 180/8.6 |
| 6,736,694 B2 * | 5/2004 | Hornsby | ............... | A63H 11/20 318/568.12 |
| 6,877,190 B2 * | 4/2005 | Berger | .................. | A44B 11/06 24/122.6 |
| 7,061,200 B2 * | 6/2006 | Iribe | .................... | B25J 13/085 180/8.5 |
| 7,640,633 B2 * | 1/2010 | Chou | .................. | A63B 33/002 24/170 |
| 7,753,146 B2 * | 7/2010 | Miyazaki | ............ | B25J 19/0091 180/8.5 |
| 9,526,979 B2 * | 12/2016 | Scott | ...................... | A63F 13/00 |
| 9,592,603 B2 * | 3/2017 | Hardouin | ................. | B25J 9/08 |
| 9,707,146 B2 * | 7/2017 | Kwon | ................ | A61H 1/0262 |
| 2004/0198169 A1 * | 10/2004 | Hornsby | ................ | A63H 3/48 446/454 |
| 2012/0183382 A1 * | 7/2012 | Couture | .................. | B25J 5/005 414/547 |
| 2014/0142475 A1 * | 5/2014 | Goldfarb | ................ | A61H 3/00 601/35 |

* cited by examiner

*Primary Examiner* — Jacob D Knutson
(74) *Attorney, Agent, or Firm* — Duane Morris LLP

(57) ABSTRACT

The present disclosure relates to the field of robot technology, and in particularly to a screw-free assembled modular robot, including a steering gear, a contour structural member, a controller and a power module, where the steering gear, the contour structural member, the controller and the power module are snap-connected by connecting members, so that the screw-free assembly of the robot can be achieved, thus the efficiency of establishing the robot can be improved and the process of establishing the robot can be simplified, thereby improving the use convenience and interestingness of the robot.

14 Claims, 11 Drawing Sheets

SCREW-FREE ASSEMBLED MODULAR ROBOT

FIELD OF THE INVENTION

The present disclosure relates to the technology field of a robot, and in particularly to a screw-free assembled modular robot.

BACKGROUND OF THE INVENTION

A robot, as a highly comprehensive product integrated with technology such as mechanics, electronics, software, sensing, control and remote manipulation, plays an increasingly important role in industries such as military, service and education, especially in the education industry. When applied in the education industry, the robot can stimulate students' interests in the technology and improve abilities of the students in various aspects. Further, as a technology carrier, the robot facilitates bionics researches. In addition, the interestingness of the robot enables the robot to be increasingly dominant in the field of toys.

In the prior art, a humanoid robot kit includes connection structures adopting numerous screw connections and structural members, and hence is complicated in assembly and disassembly, thereby significantly and negatively affecting the interests of people in the robot, which is disadvantageous for the application and popularization of the robot, especially for teaching based on the robot because a lengthy process of building the robot takes time excessively and hence is impracticable.

In view of the above problems, there is a need for a screw-free assembled modular robot, which can be established in a simplified process with reduced time.

SUMMARY OF THE INVENTION

An object of the present disclosure is to provide a screw-free assembled modular robot, which can be established in a simplified process with an improved efficiency, thereby improving the use convenience and interestingness of the robot.

The above object of the present disclosure may be realized by the following technical solutions.

A screw-free assembled modular robot, including a steering gear, a contour structural member, a controller and a power module, where the steering gear, the contour structural member, the controller and the power module are snap connected by a connecting member.

As a preferred scheme of the above screw-free assembled modular robot, the robot includes at least two steering gears which are connected to the controller by a communication bus.

As a preferred scheme of the above screw-free assembled modular robot, an inserting groove is arranged on each of the steering gear, the contour structural member, the controller and the power module, at least one side wall of the inserting groove is provided with an opening structure for receiving the connecting member, and two limiting parts, which are configured to snap connect the connecting member into the inserting groove, are symmetrically arranged at an opening of the inserting groove.

As a preferred scheme of the above screw-free assembled modular robot, the connecting member includes an I-shaped block having an I-shaped body. Two protrusions are symmetrically arranged on both sides of at least one end of the I-shaped body. The I-shaped block is insertable into the inserting groove through the opening structure of the inserting groove, and the protrusions of the I-shaped block are limited by the limiting parts.

As a preferred scheme of the above screw-free assembled modular robot, the I-shaped body is composed of an upper part and a lower part, two protrusions are symmetrically arranged on both sides of a free end of any of the upper part and the lower part, and a preset angle within a range from 0° to 180° is formed between the upper part and the lower part.

As a preferred scheme of the above screw-free assembled modular robot, the inserting groove and the I-shaped body are positioned relative to each other by a telescopic positioning mechanism, which includes an extensible protrusion and a notch matching with the extensible protrusion.

As a preferred scheme of the above screw-free assembled modular robot, the connecting member includes a half I-shaped block having a half I-shaped body, one end of the half I-shaped body is fixedly connected with the steering gear, the contour structural member, the controller and the power module, and the two protrusions are symmetrically arranged on the other end of the half I-shaped body.

As a preferred scheme of the above screw-free assembled modular robot, the connecting member includes a snap cover, a plug pin and a barb groove are arranged on one side of the snap cover, and two barbs slidable relative to the barb groove are symmetrically arranged within the barb groove. An elastic component for returning the two barbs is arranged between the two barbs, and buttons for pressing the two barbs are arranged at the outside of the snap cover.

As a preferred scheme of the above screw-free assembled modular robot, an inserting hole matching with the plug pin and a snapping groove matching with the barb are arranged on the steering gear and the contour structural member.

As a preferred scheme of the above screw-free assembled modular robot, the steering gear includes a driving disc and a driven disc, and the inserting hole and the snapping groove are arranged on both of the driving disc and the driven disc.

As a preferred scheme of the above screw-free assembled modular robot, the contour structural member includes a U-shaped structural member, which includes a cross beam and two lateral branches symmetrically arranged on both ends of the cross beam, each of the two lateral branches includes the inserting hole and the snapping groove, and the inserting groove for snap connecting with the connecting member is arranged on the cross beam.

As a preferred scheme of the above screw-free assembled modular robot, the other side of the snap cover is provided with a half I-shaped block having a half I-shaped body, one end of the half I-shaped body is connected with the snap cover, and the two protrusions are symmetrically arranged on both sides of the other end of the half I-shaped body.

As a preferred scheme of the above screw-free assembled modular robot, the controller also includes a controller base which is fixedly snap-connected to snap means arranged on the controller, the controller base has a hollow structure, a side wall of which is provided with an inserting groove and/or the connecting member for installing the steering gear.

As a preferred scheme of the above screw-free assembled modular robot, the connecting member is fixedly arranged on the power module.

As a preferred scheme of the above screw-free assembled modular robot, the contour structural member includes a U-shaped structural member, a palm structural member and a foot structural member which are configured for forming an arm or a leg of the robot.

The present disclosure has beneficial effects that: the steering gear, the contour structural member, the controller and the power module of the inventive robot can be snap-connected by the connecting members, so that the screw-free assembly of the robot can be achieved, thus the efficiency of establishing the robot can be improved and the process of establishing the robot can be simplified, thereby improving the use convenience and interestingness of the robot.

Figure 1:
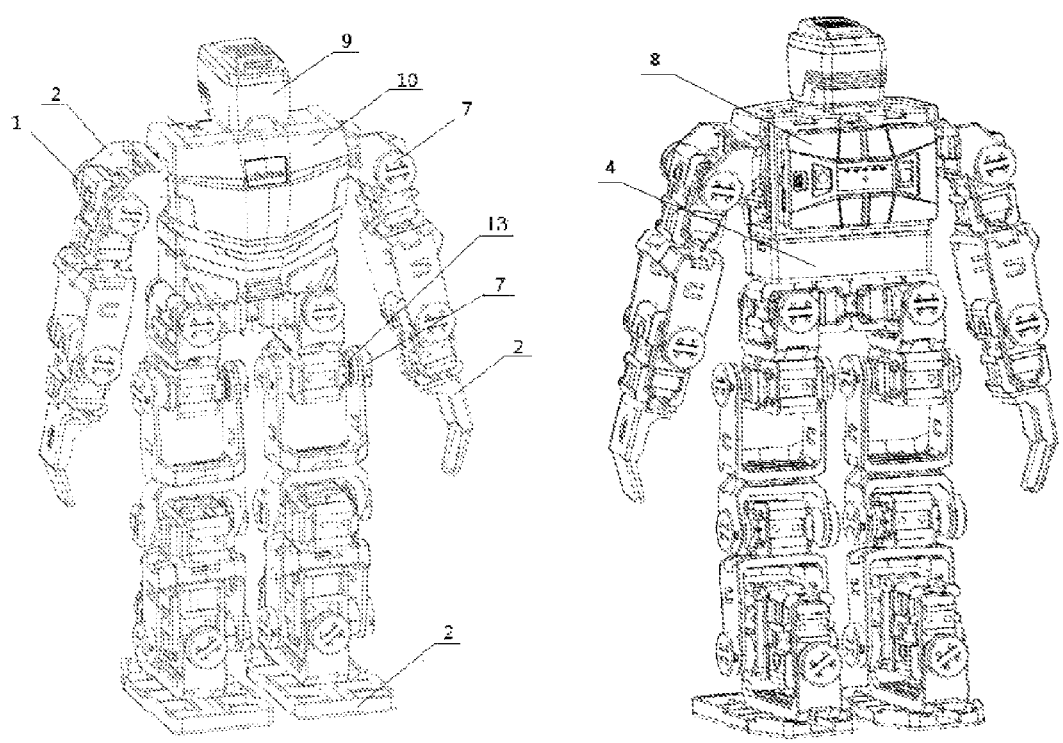
FIG. 1 is a schematic view showing a structure of a screw-free assembled modular robot according to an embodiment of the disclosure.

| Reference numeral list: | | | |
|---|---|---|---|
| 1: steering gear | 2: contour structural member | 4: power module | 5: inserting groove |
| 6: I-shaped block | 7: snap cover | 8: controller | 9: head sensing module |
| 10: chest module | 11: inserting hole | 12: snapping groove | 13: driving disc |
| 14: driven disc | 15: lug boss | 16: bearing | 17: first steering gear |
| 18: second steering gear | 21: U-shaped structural member | | 22: palm structural member |
| 23: foot structural member | | 51: opening structure | 52: limiting part |
| 53: first telescopic limiting part | | 61: I-shaped body | 62: protrusion |
| 63: second telescopic limiting part | | 71: plug pin | 72: barb groove |
| 73: barb | 74: elastic component | 75: button | 76: half I-shaped block |
| 81: controller base | 82: snap means | 83: control bus interface | 84: output interface |
| 91: integrated sensor module | 92: infrared emitter | | 93: infrared receiver |
| 94: receiving module | 101: snap end | 211: cross beam | 212: lateral branch |
| 213: elongated U-shaped structural member | | 214: wide U-shaped structural member | |

DETAILED DESCRIPTION OF THE EMBODIMENTS

The disclosure will be further described in detail below with reference to the accompanying drawings and the specific embodiments.

As shown in FIG. 1 to FIG. 19, embodiments of the disclosure provide a screw-free assembled modular robot, including a steering gear 1, a contour structural member 2, a controller 8 and a power module 4, where the steering gear 1, the contour structural member 2, the controller 8 and the power module 4 can be snap-connected by the connecting members.

As such, the various components such as the steering gear 1, the contour structural member 2, the controller 8 and the power module 4 of the robot in the disclosure can be snap-connected by the connecting members, so that the screw-free assembly of the robot can be achieved, thus the efficiency of establishing the robot can be improved and the process of establishing the robot can be simplified, thereby improving the use convenience and interestingness of the robot.

Specifically, referring to FIG. 1, the robot includes as least two steering gears 1 which are connected with the controller 8 by a communication bus. In an implementation, the robot in the embodiment includes at least sixteen steering gears 1, three of which form each arm of the robot that has three degrees of freedom, and five of which form each leg of the robot that has five degrees of freedom.

An inserting groove 5 is arranged at each of the steering gear 1, the contour structural member 2, the controller 8 and the power module 4, at least one side wall of the inserting groove 5 is provided with an opening structure 51 for receiving the connecting member, and two limiting parts 52, which are configured to snap connect the connecting member into the inserting groove 5, are symmetrically arranged at an opening of the inserting groove 5.

Now referring to FIGS. 6 and 7A to 7D, the connecting member includes an I-shaped block 6 having an I-shaped body 61, and two protrusions 62 are symmetrically arranged on both sides of at least one end of the I-shaped body 61. The I-shaped block 6 is insertable into the inserting groove 5 through the opening structure 51 of the inserting groove 5, and the protrusions 62 of the I-shaped block 6 are limited by the limiting parts 52.

Specifically, the I-shaped body 61 is composed of an upper part and a lower part, and two protrusions 62 are symmetrically arranged on both sides of a free end of any of the upper part and the lower part. A preset angle within a range from 0° to 180° may be formed between the upper part and the lower part of the I-shaped body 61.

Specifically, the upper part and the lower part of the I-shaped body 61 are formed in a one-piece structure. Alternatively, the upper part and the lower part of the I-shaped body 61 may be rotatably connected, and may be fixed relative to each other at any allowable angle therebetween, thereby improving the use convenience of I-shaped block 6 in the robot.

An I-shaped block 6 having two protrusions 62 symmetrically arranged on both sides of only one end of the I-shaped block 6 is herein referred to as is half I-shaped block 76, which forms a connecting member may be fixed on components such as the steering gear 1, the contour structural member 2, the controller 8 and the power module 4 of the robot. Specifically, the half I-shaped block includes a half I-shaped body, one end of which is fixedly connected to the steering gear 1, the contour structural member 2, the controller 8 or the power module 4, and the other end of which is provided, at both sides thereof, with two symmetrically distributed protrusions 62.

The inserting groove 5 and the I-shaped body 61 can be positioned relative to each other by a telescopic positioning mechanism, which includes an extensible protrusion and a notch matching with the extensible protrusion.

A notch structure matching with the extensible protrusion may alternatively be an extensible structure. Specifically, a first telescopic limiting part 53 configured for position limiting, which is extensible or retractable, is arranged at the bottom of the inserting groove 5, and a second telescopic limiting part 63 matching with the first telescopic limiting part 53 is arranged on the connecting member, where the second telescopic limiting part 63 is an retractable or extensible structure.

Further specifically, the first telescopic limiting part 53 and the second telescopic limiting part 63 are an extensible convexity structure or a retractable concavity structure.

The matching between the first telescopic limiting part 53 and the second telescopic limiting part 63 refers to that: the second telescopic limiting part 63 is the retractable concavity structure when the first telescopic limiting part 53 is the extensible convexity structure, and the second telescopic limiting part 63 is the extensible convexity structure when the first telescopic limiting part 53 is the retractable concavity structure.

Of course, it is possible that merely one of the first telescopic limiting part 53 and the second telescopic limiting part 63 is telescopic. Specifically, if the first telescopic limiting part 53 or the second telescopic limiting part 63 is an extensible convexity structure, the second telescopic limiting part 63 or the first telescopic limiting part 53 matching with the extensible convexity structure may be a position limiting hole.

Figure 2:
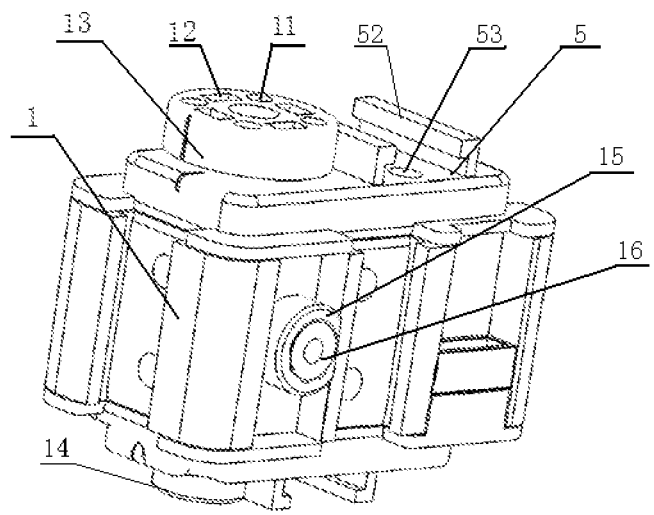
FIG. 2 is a schematic view showing a structure of a steering gear according to an embodiment of the disclosure.
Figure 3:
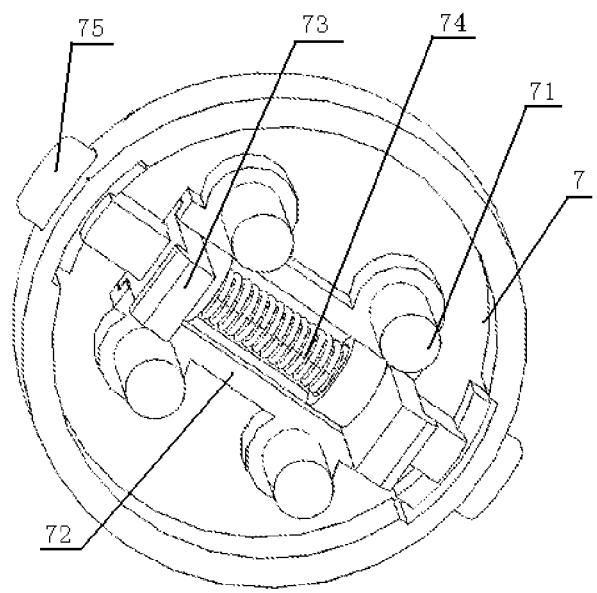
FIG. 3 is a schematic view showing a structure of a snap cover according to an embodiment of the disclosure.

Referring to FIG. 2, in the embodiment, the connecting member may further include a snap cover 7, and plug pins 71 and a barb groove 72 are arranged on one side of the snap cover 7. Two symmetrically distributed barbs 73 which are slidable relative to the barb groove 72 are arranged within the barb groove 72, an elastic component 74 for returning the two barbs 73 is arranged between the two barbs 73, and buttons 75 for pressing the two barbs 73 are arranged at the outside of the snap cover 7.

Inserting holes 11 matching with the plug pins 71 and snapping grooves 12 matching with the barbs 73 are arranged on the steering gear 1 and the contour structural member 2.

The steering gear 1 includes a driving disc 13 and a driven disc 14, both of which are provided with the inserting hole 11 and the snapping groove 12.

Figure 18:
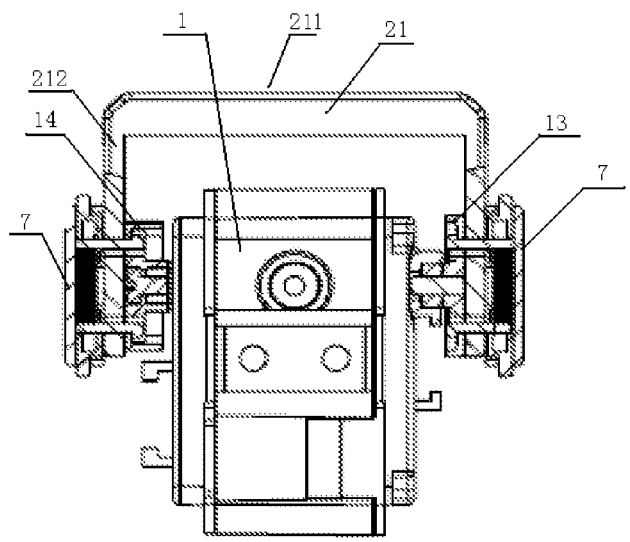
FIG. 18 is a structural schematic view showing cooperation between the steering gear and the contour structural module according to an embodiment of the disclosure.

Specifically, as shown in FIG. 18, the use of the snap cover 7 is described below. When the contour structural member 2 is fitted to the driving disc 13 and/or the driven disc 14 of the steering gear 1, the inserting hole 11 and the snapping groove 12 of the contour structural member 2 are respectively aligned with the inserting hole 11 and the snapping groove 12 of the driving disc 13 and/or the driven disc 14, then the buttons 75 on the snap cover 7 are pressed down to compress the elastic component 74, and the barbs 73 are moved to a position corresponding to the snapping grooves 12 of the driven disc 14 or the driving disc 13 of the steering gear 1, so that the barbs 73 can be put into the snapping grooves 12. Subsequently, when the buttons 75 are released, the barbs 73 are returned outward by the elastic component 74 to engage into the snapping groove 12, thus the snap cover 7 is fixedly connected to the driven disc 14 or the driving disc 13 of the steering gear 1, thereby achieving the connection between the contour structural member 2 and the steering gear 1.

Referring to FIG. 2, the steering gear 1 includes at least one driven disc 14. In a specific steering gear 1, a cylindrical lug boss 15 is arranged opposite to the driving disc 13 or cylindrical lug bosses 15 are arranged on the left and right sides of the driving disc 13, and a bearing 16 is extended through the lug boss 15. The bearing 16 is configured for installation of the driven disc 14. Specifically, a pin shaft cooperating with the bearing 16 is arranged at the center of the driven disc 14, so that the driven disc 14 can be fitted on the lug boss 15 through the cooperation between the pin shaft and the bearing 16. It is note that the bearing 16 may be omitted from the lug boss 15 when the driven disc 14 is not necessary on certain lug boss 15.

Figure 4:
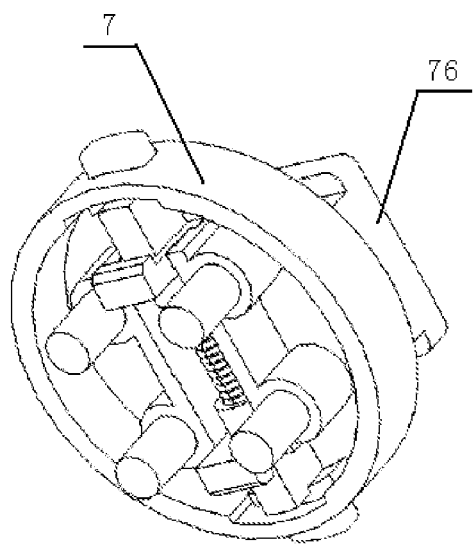
FIG. 4 is a schematic view showing a structure of a snap cover with a half I-shaped block according to an embodiment of the disclosure.
Figure 5:
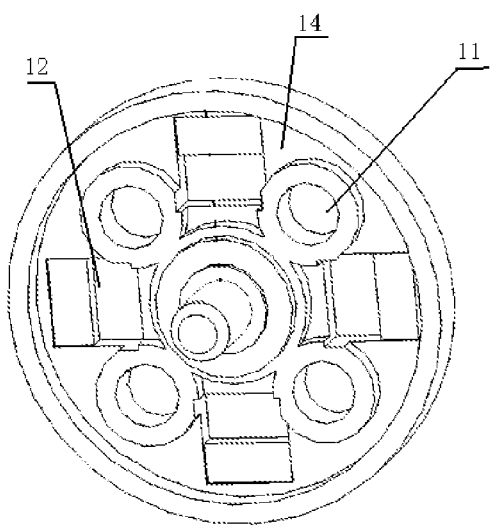
FIG. 5 is a schematic view showing a structure of a driven disc according to an embodiment of the disclosure.
Figure 6:
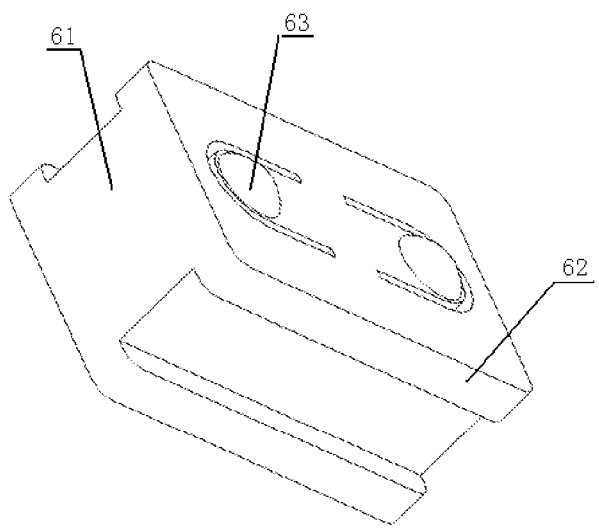
FIG. 6 is a schematic view showing a structure of an I-shaped block according to an embodiment of the disclosure.
Figure 7A:
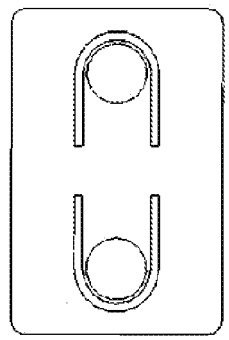
FIGS. 7A, 7B, 7C and 7D are structural schematic views showing various angles between an upper part and a lower part of the I-shaped block according to an embodiment of the disclosure.
Figure 7B:
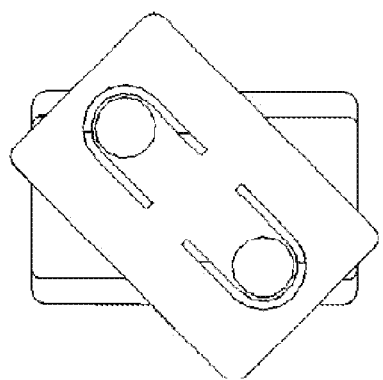
Figure 7C:
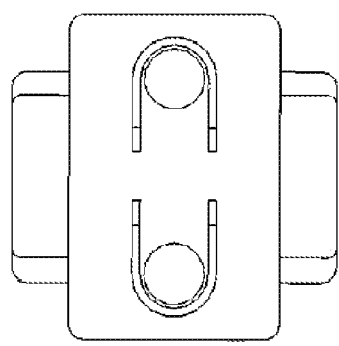
Figure 7D:
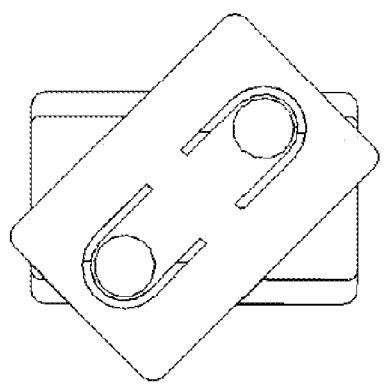
Figure 8:
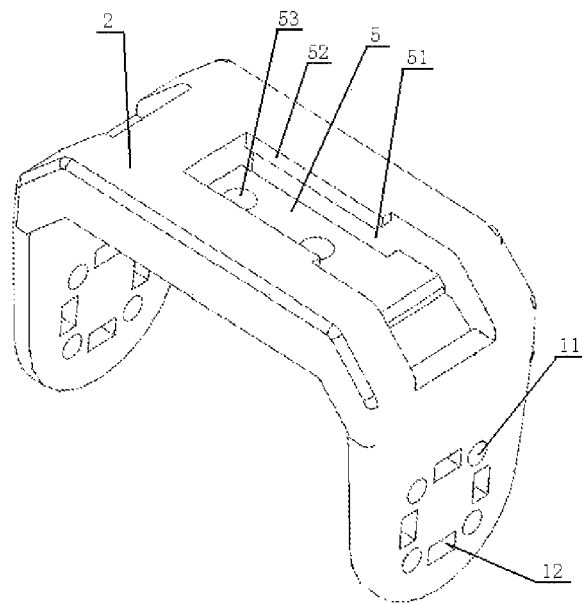
FIG. 8 is a schematic view showing a structure of a contour structural member according to an embodiment of the disclosure.

Referring to FIG. 4, the other side of the snap cover 7 is provided with a half I-shaped block 76 having a half I-shaped body, where one end of the half I-shaped body is connected with the snap cover 7, and two protrusions are symmetrically arranged on both sides of the other end of the half I-shaped body.

As such, the half I-shaped block 76 may be arranged on the snap cover 7 and configured to fixedly connect the contour structural member 2, so that a rotary torque provided by the driving disc 13 of the steering gear 1 can be output to the contour structural member 2 (for example a mechanical arm) through the snap cover 7. The provision of the half I-shaped block 76 on the snap cover 7 makes connections convenient and saves space.

Figure 9:
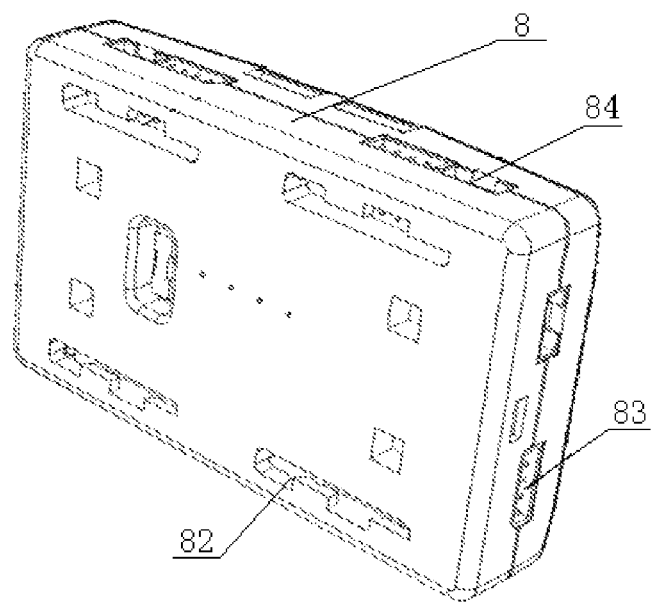
FIG. 9 is a schematic view showing a structure of a controller according to an embodiment of the disclosure.
Figure 10:
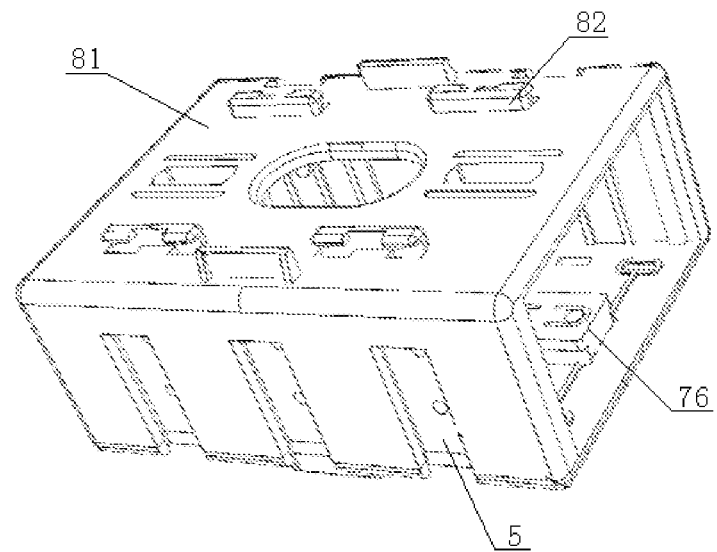
FIG. 10 is a structural schematic view of a controller base according to an embodiment of the disclosure.
Figure 11:
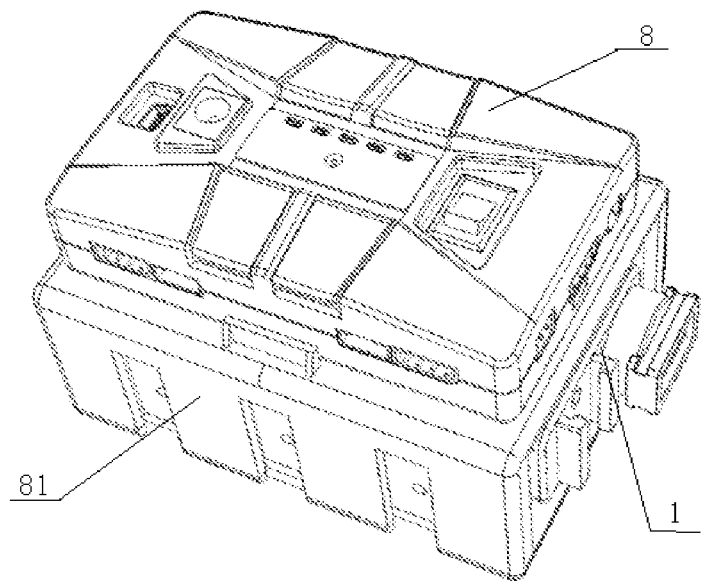
FIG. 11 is a structural schematic view showing the controller which includes the controller base according to an embodiment of the disclosure.

Referring to FIG. 9 to FIG. 11, the controller 8 includes at least one control bus interface 83 for connecting to an output bus and at least one analog input/digital output interface 84 for inputting of various analog sensor signals and outputting of digital signals.

The controller 8 also includes a controller base 81 which is fixedly snap-connected to snap means 82 arranged on the controller 8, and the controller base 81 has a hollow structure, a side wall of which is provided with an inserting groove 5 and/or a connecting member for installing the steering gear. Specifically, the connecting member is the half I-shaped block 76.

Figure 12:
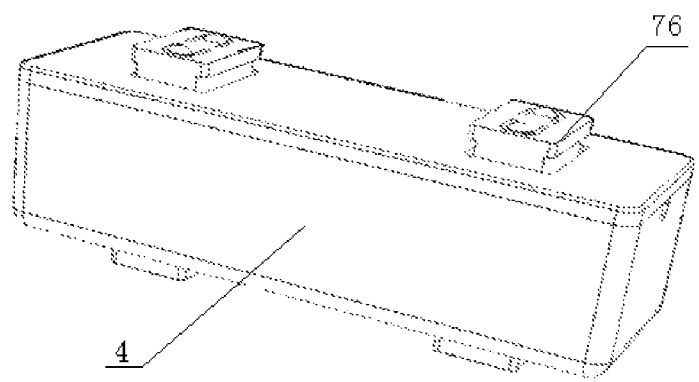
FIG. 12 is a schematic view showing a structure of a power module according to an embodiment of the disclosure.

Referring to FIG. 12, a connecting member is fixedly arranged on the power module 4. Specifically, two connecting members for fixation are arranged on any of the upper and lower surfaces of the power module 4, the connecting member may be the half I-shaped block 76 having a half I-shaped body, one end of the half I-shaped body is fixedly connected to the power module, and the two protrusions are symmetrically arranged on both sides of the other end of the half I-shaped body.

Figure 15:
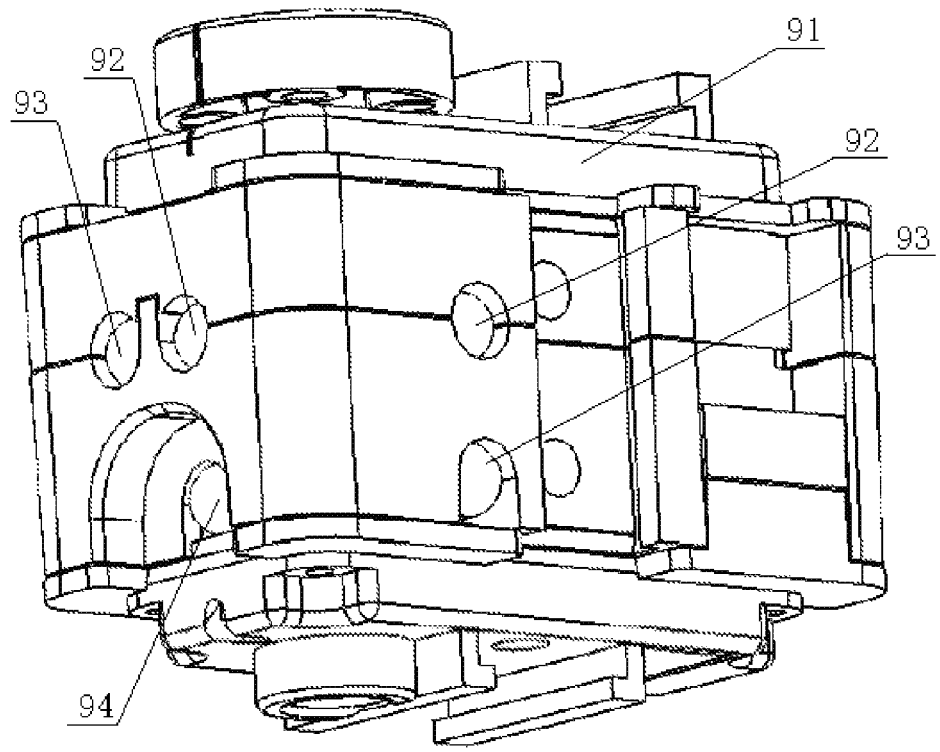
FIG. 15 is a schematic view showing a structure of a head sensing module according to an embodiment of the disclosure.
Figure 16:
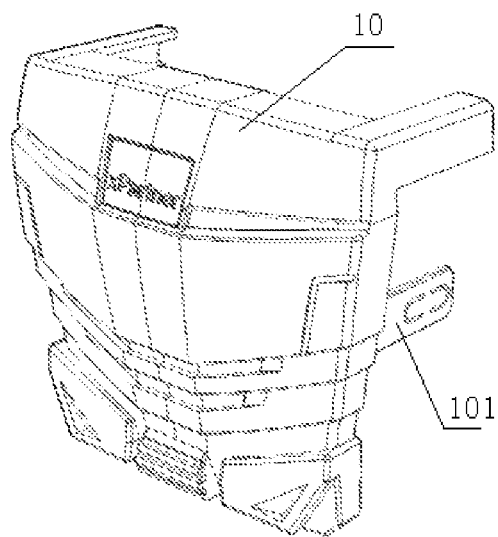
FIG. 16 is a schematic view showing a structure of a chest module according to an embodiment of the disclosure.
Figure 17:
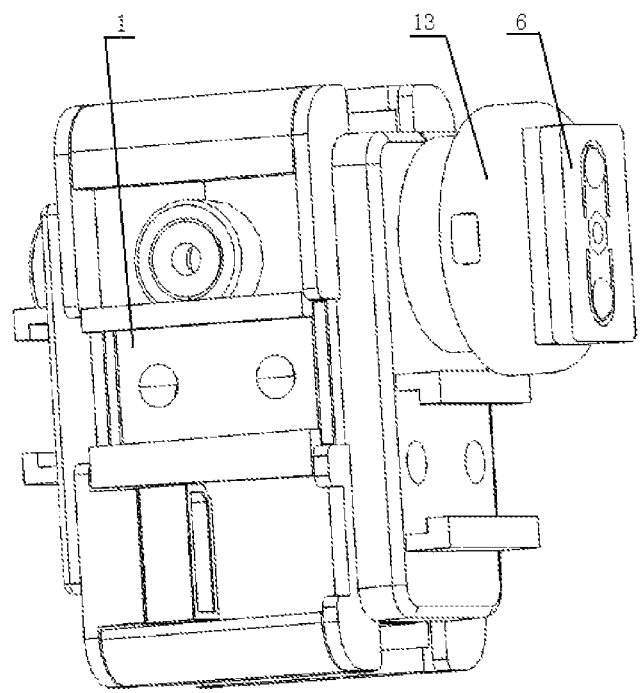
FIG. 17 is a structural schematic view showing cooperation between the steering gear and the I-shaped block according to an embodiment of the disclosure.

Referring to FIGS. 15 and 16, the screw-free assembled modular robot further includes at least one head sensing module 9 and a chest module 10. The head sensing module 9 includes an integrated sensor module 91 and a light display panel, and an inserting groove for fixedly connecting the integrated sensor module with the connecting member is arranged on at least one surface of the head sensing module 9. The integrated sensor module 91 is configured to sense sound and distance and emit and receive an infrared decoded signal, and the internal light display panel is configured to allow the face of the robot to emit light. The chest module 10 is configured to allow the chest of the robot to emit light. Specifically, the integrated sensor module 91 can achieve a distance measurement function through an infrared transmitter 92 and an infrared receiver 93, and a sound sensing function through an internal sound sensor, and a receiving module 94 can be employed to emit and receive the infrared decoded signal.

The chest module 10 further includes a snap end 101 which may be snap connected within the inserting groove of the steering gear 1, for the fixation of the chest module 10.

The screw-free assembled modular robot further includes a Bluetooth remote-controller cooperating with the controller 8 of the robot, and the remote-controller is used for command communication and data interaction with the controller 8. As such, the transmission and reception of control commands can be achieved through the connection between the Bluetooth remote-controller and the controller 8, thereby achieving the remote control to the robot.

Figure 13:
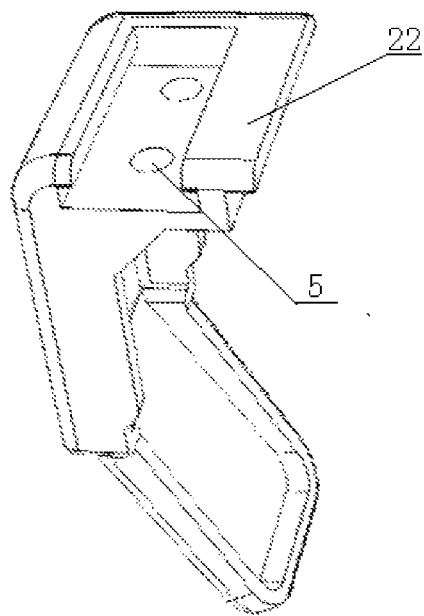
FIG. 13 is a schematic view showing a structure of a palm structural member according to an embodiment of the disclosure.
Figure 14:
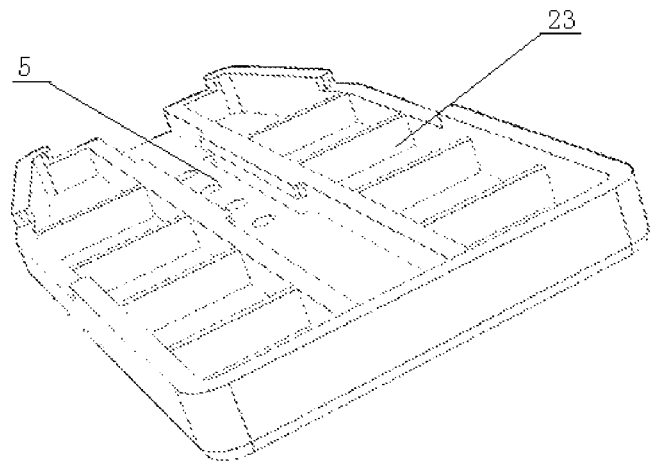
FIG. 14 is a schematic view showing a structure of a foot structural member according to an embodiment of the disclosure.

Referring to FIGS. 13 and 14, the contour structural members include the U-shaped structural member 21 for forming arms and legs of the robot, a palm structural member 22 and a foot structural member 23.

Any of the arm and the leg is formed by at least one U-shaped structural member 21 and the steering gear 1 connected to the U-shaped structural member 21. The U-shaped structural member 21 includes a cross beam 211 and two lateral branches 212 arranged symmetrically on both sides of the cross beam 211, and each of the two lateral branches 212 includes a snap hole corresponding to the snapping groove 12 of the driving disc 13 or the driven disc 14 of the steering gear 1, and an inserting hole corresponding to the inserting hole 11 of the driving disc 13 or the driven disc 14 of the steering gear 1, and an inserting groove 5 for snap connecting with the connecting member is arranged on the cross beam 211.

Specifically, to fit the steering gear 1 with the U-shaped structural member 21, the two lateral branches of the U-shaped structural member 21 are overlapped with the driving disc 13 and the driven disc 14 of the steering gear 1, respectively, and the U-shaped structural member 21 and the steering gear 1 are fixedly connected by the snap cover 7. Further specifically, the plug pins 71 on the snap cover 7 pass through the inserting holes in the lateral branch of the U-shaped structural member 21 and are fixed in the inserting hole 11 of the driven disc 14 or the driving disc 13 of the steering gear 1, and the barbs 73 pass through the snapping holes in the two lateral branches of the U-shaped structural member 21 and are engaged within the snapping grooves of the driven disc 14 or the driving disc 13 of the steering gear 1, so that the rotary torque provided by the steering gear 1 can be output by the U-shaped structural member 211. The inserting groove for fixedly snap connecting the steering gear 1 to the connecting member may be arranged on the cross beam 211 of the U-shaped structural member 21.

Figure 19:
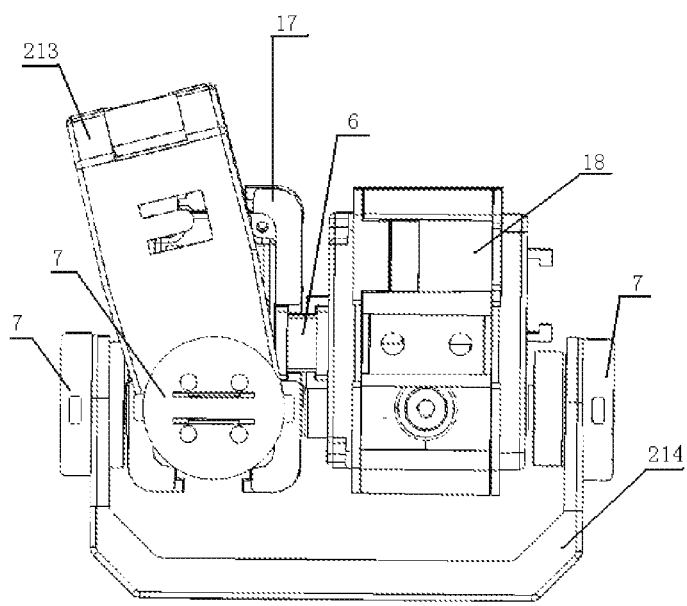
FIG. 19 is another structural schematic view showing cooperation between the steering gear and the contour structural module according to an embodiment of the disclosure.

In order to further describe the connecting member, the embodiment provides another U-shaped structural member which cooperates with the steering gear. As shown in FIG. 19, the cooperation between the U-shaped structural member and the steering gear is implemented by two steering gears (i.e., a first steering gear 17 and a second steering gear 18), one elongated U-shaped structural member 213, one wide U-shaped structural member 214, one I-shaped block 6, two driven discs 14 and four snap covers 17, thereby obtaining a dual-steering-gear output module having two degrees of freedom. One lateral branch of the elongated U-shaped structural member 213 is connected to the driving disc 13 of the first steering gear 17 through the snap cover 7, and the other lateral branch of the elongated U-shaped structural member 213 is connected to the driven disc 14, thereby obtaining the output of the rotary torque by both ends of the first steering gear 17. One side of the first steering gear 17 is connected to the second steering gear 18 through an I-shaped block 6, and a driving disc 13 is arranged at a side of the second steering gear 18 that is opposite to the side of the second steering gear 18 connecting the first steering gear 17. Further, one lateral branch of the wide U-shaped structural member 214 is fixedly connected to the driving disc 13 of the second steering gear 18 through a snap cover 7, and the other lateral branch of the wide U-shaped structural member 214 is fixedly connected to the driven disc 14 at the side of the second steering gear 18 through a snap cover 7, thereby obtaining the output of the rotary torque by both ends of the second steering gear 18. The direction of the rotary torque output by both ends of the second steering gear 18 is different form the direction of the rotary torque output by both ends of the first steering gear 17, and these rotary torques are independent of each other, further, the resultant structure is compact and connections therein are convenient.

The technical principle of the present disclosure has been described as above in combination with the embodiments. These descriptions are only intended to explain the principle of the disclosure rather than limiting the protection scope of the disclosure in any way. Based on these explanations, other specific embodiments of the disclosure may readily occur to those skilled in the art without paying a creative work and these embodiments all fall within the protection scope of the disclosure.

The invention claimed is:

1. A screw-free assembled modular robot, comprising at least one steering gear (1), a contour structural member (2), a controller (8) and a power module (4), wherein the at least one steering gear (1), the contour structural member (2), the controller (8) and the power module (4) are snap connected by a connecting member, an inserting groove (5) is arranged on each of the at least one steering gear (1), the contour structural member (2), the controller (8) and the power module (4), at least one side wall of the inserting groove (5) is provided with an opening structure (51) for receiving the connecting member, and two limiting parts (52), which are configured to snap connect the connecting member into the inserting groove, are symmetrically arranged at an opening of the inserting groove (5).

2. The screw-free assembled modular robot according to claim 1, wherein the at least one steering gear (1) comprises at least two steering gears (1) which are connected to the controller (8) by a communication bus.

3. The screw-free assembled modular robot according to claim 1, wherein the connecting member comprises an I-shaped block (6) having an I-shaped body (61), two protrusions (62) are symmetrically arranged on both sides of at least one end of the I-shaped body (61), the I-shaped block (6) is insertable into the inserting groove (5) through the opening structure (51) of the inserting groove (5), and the protrusions (62) of the I-shaped block (6) are limited by the limiting parts (52).

4. The screw-free assembled modular robot according to claim 3, wherein the I-shaped body (61) is composed of an upper part and a lower part, two protrusions (62) are symmetrically arranged on both sides of a free end of any of the upper part and the lower part, and a preset angle within a range from 0° to 180° is formed between the upper part and the lower part.

5. The screw-free assembled modular robot according to claim 4, wherein the inserting groove (5) and the I-shaped body (61) are positioned relative to each other by a telescopic positioning mechanism, which includes an extensible protrusion and a notch matching with the extensible protrusion.

6. The screw-free assembled modular robot according to claim 1, wherein the connecting member comprises a half I-shaped block having a half I-shaped body, one end of the half I-shaped body is fixedly connected with the at least one steering gear (1), the contour structural member (2), the controller (8) and the power module (4), and the two protrusions (62) are symmetrically arranged on the other end of the half I-shaped body.

7. The screw-free assembled modular robot according to claim 1, wherein the connecting member is fixedly arranged on the power module (4).

8. The screw-free assembled modular robot according to claim 1, wherein the contour structural member comprises a U-shaped structural member (21), a palm structural member (22) and a foot structural member (23) which are configured for forming an arm or a leg of the robot.

9. A screw-free assembled modular robot, comprising at least one steering gear (1), a contour structural member (2), a controller (8) and a power module (4), wherein the at least one steering gear (1), the contour structural member (2), the controller (8) and the power module (4) are snap connected by a connecting member, the connecting member comprises a snap cover (7), a plug pin (71) and a barb groove (72) are arranged on one side of the snap cover (7), and two barbs (73) slidable relative to the barb groove (72) are symmetrically arranged within the barb groove (72), an elastic component (74) for returning the two barbs (73) is arranged between the two barbs (73), and buttons (75) for pressing the two barbs (73) are arranged at the outside of the snap cover (7).

10. The screw-free assembled modular robot according to claim 9, wherein an inserting hole (11) matching with the plug pin (71) and a snapping groove (12) matching with the barb (73) are arranged on the at least one steering gear (1) and the contour structural member (2).

11. The screw-free assembled modular robot according to claim 10, wherein the at least one steering gear (1) comprises a driving disc (13) and a driven disc (14), and the inserting hole (11) and the snapping groove (12) are arranged on both of the driving disc (13) and the driven disc (14).

12. The screw-free assembled modular robot according to claim 10, wherein the contour structural member (2) comprises a U-shaped structural member, which includes a cross beam (211) and two lateral branches (212) symmetrically arranged on both ends of the cross beam (211), each of the two lateral branches (212) includes the inserting hole (11) and the snapping groove (12), and an inserting groove (5) for snap connecting with the connecting member is arranged on the cross beam (211).

13. The screw-free assembled modular robot according to claim 9, wherein the other side of the snap cover (7) is provided with a half I-shaped block having a half I-shaped body, one end of the half I-shaped body is connected with the snap cover (7), and two protrusions (62) are symmetrically arranged on both sides of the other end of the half I-shaped body.

14. A screw-free assembled modular robot, comprising at least one steering gear (1), a contour structural member (2), a controller (8) and a power module (4), wherein the at least one steering gear (1), the contour structural member (2), the controller (8) and the power module (4) are snap connected by a connecting member, the controller (8) also comprises a controller base (81) which is fixedly snap-connected to snap means (82) arranged on the controller (8), the controller base (81) has a hollow structure, a side wall of which is provided with at least one of an inserting groove (5) and the connecting member for installing the at least one steering gear (1).

* * * * *